Patented July 10, 1945

2,380,046

UNITED STATES PATENT OFFICE 2,380,046

METHOD OF MAKING COFFEE EXTRACT

Richard Huguenin, Stamford, Conn., assignor to Inredeco, Inc., Panama City, Panama, a corporation of Panama No Drawing. Application May 26, 1943, Serial No. 488,525

9 Claims. (Cl. 99—71)

This invention relates to a new and improved method of making coffee extract.

The principal objects of the invention are to make a dried and powdered coffee extract which has retained maximum aroma and a maximum proportion of the soluble coffee solids.

Another object of the invention is to make the coffee extract in a plurality of stages from freshly roasted ground coffee, so that the major portion of the aromatic ingredients of the extract will be secured in a first stage, and the extraction of the non-aromatic soluble coffee solids which affect the flavor and body of the extract, will be carried on in a subsequent stage.

Another object of the invention is to provide an improved method for securing a suitable high concentration of the aromatic and non-aromatic ingredients of the coffee in a liquid coffee extract. This liquid coffee extract can be sold as an article of commerce, or the water can be evaporated therefrom by means of drum-drying or spray-drying, or by any other method, in order to secure a dry extract which is preferably, but not necessarily, in finely divided powder form.

Numerous additional objects of the invention will be stated in the annexed description.

In the final step of evaporating water from a liquid coffee extract, in order to secure a dry coffee extract, it is desirable that the coffee extract which is thus treated in the final step, should be highly concentrated. The high concentration of the liquid coffee extract which is subjected to this final drying operation, is desirable so that the powdered extract which is secured as the result of such final drying operation shall be a powder which is easily miscible with water. This is particularly advantageous when the final drying operation is performed by means of drum-drying.

The initial coffee extract which is secured by percolating hot water through freshly ground and roasted coffee in the ordinary manner, can be concentrated by means of evaporation under reduced pressure. However, such concentration in vacuum causes the loss of the aromatic substances of the ordinary liquid coffee extract, which are easily evaporated.

The aromatic substances are taken up by the water from the freshly roasted and ground coffee, largely in the earliest stage of the aqueous extraction, and at a relatively low temperature in said aqueous extraction. On the contrary, the aqueous extraction of the soluble coffee solids, which produce the flavoring and body of the coffee extract, is increased with the length of the period of the aqueous extraction and by increasing the temperature of the aqueous extraction. This is particularly true, if any part of the roasted and ground coffee is hydrolyzed during the aqueous extraction of the soluble coffee solids. However, the aqueous extraction at high temperature, or for a long period of time, injures the aroma of the aqueous extract.

Therefore, according to this invention, the process of securing the liquid extract is divided into a plurality of stages. In the particular embodiment of the invention which is disclosed herein, two stages are utilized.

Stage No. 1

In this stage, freshly roasted and ground coffee is treated with water whose temperature does not exceed 100° C., in order to make an extract which is designated as "extract A." The water, whose temperature does not exceed substantially 100° C. can be percolated through a mass of freshly roasted and ground coffee, according to any approved practice. Since apparatus for making such liquid extract is old and well-known per se, such apparatus is not described herein. The water can be forced successively through a series of cells in which columns of freshly roasted and ground coffee are located.

The liquid coffee extract which is thus secured can be substantially free from coffee fat under suitable conditions, in which the ground coffee acts as a self-filter. In making extract A for instance, about 1 litre of liquid coffee extract may be made per kilogram of ground coffee. Extract A contains all or a major part of the volatile aromatic constituents of the ground coffee. Extract A is handled and stored so as to prevent or minimize the evaporation of said aromatic constituents. For this purpose, extract A can be held in a closed vessel, where it may be cooled to a temperature of below 15° C.

In a commercial utilization of this invention, about 100 kilograms of ground coffee are treated with 100 kilograms of water during a total period of about 30 minutes, in order to make extract A. As an example, the average temperature of the water which is used in making extract A may be approximately 50° C.

Stage No. 2

The spent coffee grounds which remain after the extraction of extract A are now treated to make a second extract, which is designated as "extract B." In the second stage, the temperature of the water is above 130° C. As an illustration, the average temperature of the water may be about 160° C. In this second stage, the hemi-cellulose and cellulose of the spent coffee grounds are partially hydrolyzed. This hydrolysis results from the presence of coffee acids which are in the spent coffee grounds. If desired, the water which is used in the second stage may be acidified. For example, each kilogram of water which is used in the second stage may be acidified by means of 1 gram of sulfuric acid. The water which is used in the second stage can be forced under suitable pressure, through the same cells in which the freshly roasted ground coffee has been originally located, while making extract A. It is therefore not necessary to remove the spent coffee grounds from said cells, in making extract B.

Extract B will be stronger in proportion to the length of the period of extraction, the temperature of extraction, and the acidity of the water which is used in the second extraction.

As a commercial illustration, if the weight of the freshly roasted ground coffee is 100 kilograms, I can use 200 kilograms of water in stage No. 2, at an average temperature of 160° C. and without acidifying said water, the total period of extraction being 120 minutes.

As another commercial illustration, I can acidify said water by means of 1 gram of sulfuric acid per kilogram of water, and make extract B during a total period of 240 minutes, the average temperature of the acidified water being 130° C.

While I can increase the percentage of solids in extract B by increasing the period of extraction, or by increasing the temperature of the extraction, or by increasing the acidity of the water, it is preferable to concentrate extract B by evaporating some of the water therefrom.

As an example, 100 kilograms of freshly roasted and ground coffee are extracted according to the method stated in stage No. 1, in order to make 100 kilograms of extract A. Said extract A has 25 kilograms of total solids. Said 25 kilograms of total solids include 14 kilograms of carbohydrates. Hence, extract A consists of 75% of water, 11% of non-carbohydrate solids, and 14% of dissolved carbohydrates. The spent coffee grounds which remain after the extraction of extract A, are then treated with sufficient water at an average temperature of 160° C. during a total period of 120 minutes, in order to produce 200 kilograms of extract B. This extract B consists of 90% of water and 10% of total solids which are dissolved or finely dispersed in the water. 1% of this extract B consists of non-carbohydrates and 9% of extract B consists of dissolved carbohydrates.

Extract A and extract B are then intermixed while they are at a temperature of, for instance, 10° C. The mixture contains 15% of total solids, consisting of 4.4% of non-carbohydrates and 10.6% of dissolved carbohydrates. Hence, the weight of the carbohydrates is 71% of the total solids.

The aforesaid mixture of extract A and extract B can be dried by any drying method, including spray-drying, drum-drying, etc. Such final drying operation can be performed under reduced pressure.

Prior to said final drying operation, additional carbohydrates can be added, preferably to extract A before mixing it with extract B, so that the percentage by weight of carbohydrates in the mixture will be about 75% of the total solids. The carbohydrates in extract A and extract B do not include sucrose. If any additional carbohydrate is added to the mixture of extract A and extract B, such additional carbohydrate can be maltrose or dextrose or other edible carbohydrate which is freely soluble in water and which has little or no sweetening action. However, I do not exclude the use of added sucrose.

In the case above mentioned, in which I treat a batch of 100 kilograms of freshly roasted and ground coffee, and in which the weight of extract B is 200 kilograms, such extract B can be concentrated before intermixing it with extract A, for instance by evaporating the water from extract B under reduced pressure.

If desired, I can concentrate extract B by evaporating water therefrom until, as an example, the weight of concentrated extract B is 15% of the original weight. Such concentrated extract B will contain 66.7% by weight of total solids, consisting of 6.7% of non-carbohydrate solids and 60.0% of dissolved carbohydrates.

Extract A and concentrated extract B are then intermixed, while at a temperature of, for instance, 10° C. The mixture contains 34.6% of total solids, consisting of 10% non-carbohydrates and 24.6% of dissolved carbohydrates. Hence the weight of the carbohydrates is 71% of the total solids. Additional carbohydrates may be added, preferably to extract A, before intermixing extract A with concentrated extract B.

As an example, a specimen run, with the use of 100 kilograms of freshly roasted and freshly ground coffee is set forth as follows:

| Extract | Weight of extract in kilograms | Weight of solids in extract in kilograms | Percentage of solids in extracts | Weight of carbohydrates in kilograms | Percentage of carbohydrates in solids |
|---|---|---|---|---|---|
| A | 100 | 25 | 25 | 14 | 56 |
| B, unconcentrated | 200 | 20 | 10 | 18 | 90 |
| B, concentrated | 30 | 20 | 66.7 | 18 | 90 |
| A, mixed with unconcentrated B | 300 | 45 | 15 | 32 | 71 |
| A, mixed with concentrated B | 130 | 45 | 34.6 | 32 | 71 |
| A, mixed with concentrated B, and also with a solution of 9 kilograms of carbohydrates dissolved in one kilogram of water | 140 | 54 | 38.5 | 41 | 76 |

In extract A, the non-carbohydrate solids consist of caffeine, salts, coffee acids and soluble proteins. The carbohydrates consist of about 20% of pentose and 80% of hexoses.

If no acid is added to the water which is used in making extract B, appreciable hydrolysis occurs only when the temperature is at least about 130° C. Under commercial working conditions, the highest inlet temperature of the water which is used in making extract B, is about 190° C.

A temperature of 197° C. corresponds to a boiler pressure of 200 lbs. per square inch, without superheating the steam. There is some loss of temperature from the boilers to the cells or percolators, so that the inlet temperature of the water is about 190° C., which corresponds to a pressure in the percolators or cells, which is slightly below fourteen atmospheres.

However, higher temperatures and pressures can be utilized.

Since hydrolysis requires heat and there is some loss of heat by radiation, the temperature at the outlet of the percolators may be 30° C. to 60° C. lower than at their inlet. Hence, if the inlet temperature of the water is 190° C., the outlet temperature at the last percolator of the series-coupled percolators may be 130° C., corresponding to an average temperature of 160° C.

If the water is acidified with sulfuric acid or other suitable acid, and said water is forced through the percolators during an extraction period of four hours instead of two hours, the inlet temperature may be 160° C. and the outlet temperature may be 100° C., so that the average temperature of the acidified water is 130° C., during each passage through the series-coupled percolators or cells.

With most types of coffee, sufficient coffee acid is produced by normal roasting, so that the addition of acid is not required, in order to produce hydrolysis.

If the water of the liquid coffee extract is removed by drum-drying, it is desirable to use, in said drum-drying operation, a liquid extract which has at least 30% of solids by weight, in order to secure a powdered coffee extract which is easily miscible with water.

Hence, if the dry powdered coffee extract is to be made by drum-drying in the final step, it is preferred to concentrate extract B mixing it with extract A, and then to drum-dry the liquid mixture which has 30% or more of dissolved solids.

Extract B can be concentrated in vacuum because it has little or no volatile aromatic ingredients.

When the water of the mixed extracts is evaporated, which can be done under normal atmospheric pressure or under reduced pressure, the solids, particularly the carbohydrates, minimize the loss of volatile aromatic ingredients of extract A. For this reason, a large percentage of dissolved carbohydrates is desirable. The mixture of the unconcentrated extracts can be concentrated to dry form by spray-drying and even by drum-drying. However, for best results, it is desirable to spray-dry or drum-dry a mixed liquid extract in which the weight of the dissolved carbohydrates is at least approximately 30% of the weight of the mixed liquid extract.

The constituents of the respective liquid extracts will depend upon the type of coffee.

Generally speaking, extract A is made so as to contain at least a major proportion, and preferably substantially all, of the water-soluble proteins and carbohydrates of the coffee. Each extract is quickly cooled to and it is maintained at a suitable low temperature of about 10° C., preferably not above 15° C.

The mixed extracts are led into the drying apparatus at a temperature of about 10° C.

I have described a preferred embodiment of my invention, but it is clear that numerous changes and omissions and additions can be made, without departing from its scope.

While I can use water up to a maximum temperature of substantially 100° C. in making the first extract, I prefer that in making such first extract, the temperature of the water should be between 50° C. and 80° C.

In making such extract, the water can be continuously circulated, if desired, through the material which is being extracted.

For example, extract A is made during an extraction period of 30 minutes. During said period, the water can be circulated continuously, if desired, under suitable pressure, through the series-connected cells in which the freshly roasted and freshly ground coffee is located. The extract can thus be made in a closed system, to prevent exposure to air, and to prevent the loss of any volatile ingredients. After extract A has been thus made, it can be pumped through a cooled coil into a closed vessel, when it can be kept at low temperature, thus preventing any loss of aromatic volatile ingredients.

The same apparatus and method can be used in making extract B.

Whenever I refer to the proportions of solids in a concentrated or unconcentrated liquid extract, or to the relative proportions of the non-carbohydrate and carbohydrate in a concentrated or unconcentrated extract, or to any other figure which is stated herein, there can be a variation of 20% from such figure, without departing from the scope of the invention.

As an example, I have stated that the unconcentrated extract A has 25% by weight of solid material. This percentage may be lowered to 20%, and such variation is included when I state, in a claim or claims, that the first liquid extract contains about 25% by weight of dissolved solids. Similarly, the percentage of carbohydrates, in the dissolved solids of extract A, may be as low as 45% instead of 56%. This variation will depend, to some extent, upon the type of coffee bean which is utilized.

Similarly, the concentrated extract B may contain only 54% by weight of solids.

If the additional carbohydrate is dissolved either in extract A or extract B, this is equivalent to dissolving such additional carbohydrate in the mixture of such extracts.

The liquid extracts are preferably made so as to be substantially free from coffee-fat, since such fat would turn rancid in the dry extract.

Numerous changes and omissions and additions can be made in the preferred examples, without departing from the scope of the invention.

I claim:

1. A method of making a dry coffee extract, which consists in extracting roasted and ground coffee with water at a maximum temperature of substantially 100° C. to produce a first aqueous extract which contains substantially all the volatile aromatic constituents of said coffee, then making a second aqueous extract of the spent coffee grounds at a temperature above 100° C. while hydrolyzing at least some of the hydrolyzable portion of said grounds at a temperature above 100° C., said extracts being sufficiently dilute so that their mixture contains less than 30% of solids by weight, then concentrating the second aqueous extract until the mixture of the concentrated second extract and of the substantially unconcentrated first extract will have at least substantially 30% of solids by weight, then intermixing said concentrated extract and said substantially unconcentrated first extract at a temperature below 100° C. while retaining said aromatic constituents to form said mixture, and then evaporating the water of said mixture to produce said dry extract.

2. A method according to claim 5, in which said second aqueous extract is made originally with at least substantially 10% by weight of dissolved solids, and in which said second aqueous extract is concentrated until it contains at least substantially 66% by weight of solids, said second extract being made originally with a smaller proportion of solids than said first extract.

3. A method according to claim 5, in which said second aqueous extract is made originally with at least substantially 10% by weight of solids, said second aqueous extract is concentrated until it contains at least substantially 66% by weight of solids, and in which carbohydrate material is dissolved in said mixture prior to evaporating the same, said carbohydrate material being added in sufficient proportion so that the total carbohydrate material in said dry coffee extract is at least 60% of the weight of said dry coffee extract, said second extract being made originally with a smaller proportion of dissolved solids than said first extract.

4. A method of making a dry coffee extract which consists in extracting roasted and ground coffee with water at a maximum temperature of substantially 100° C. to produce a first aqueous extract which contains at least substantially 25% by weight of dissolved solids and which also contains substantially all the aromatic constituents of said coffee, making a second aqueous extract of the spent coffee grounds with water at a temperature sufficiently above 100° C. to produce a second liquid extract which has substantially 10% by weight of dissolved solids, mixing said extracts at a temperature below 100% C. while retaining said aromatic constituents and evaporating the water from said mixed extracts to produce said dry coffee extract, said second extract being made originally with a smaller proportion of dissolved solids than said first extract.

5. A method of making a dry coffee extract which consists in extracting roasted and ground coffee with water at a maximum temperature of substantially 100° C. to produce a first aqueous extract which has at least substantially 25% by weight of dissolved solids and which also contains substantially all the aromatic constituents of said coffee, making a second aqueous extract of the spent coffee grounds with water at a temperature sufficiently above 100° C. to hydrolyze at some of the coffee grounds and to produce a second liquid extract which has at least substantially 10% by weight of solids, concentrating said second aqueous extract until it contains at least substantially 66% by weight of solids, mixing the substantially unconcentrated first aqueous extract with the second aqueous extract at a temperature below 100° C. while retaining said aromatic constituents, and evaporating the water from said mixed extracts to produce said dry coffee extract, said second extract being made originally with a smaller proportion of dissolved solids than said first extract.

6. A method of making a dry coffee extract which consists in extracting roasted and ground coffee with water at a maximum temperature of about 100° C. to provide a first aqueous extract which contains substantially 25% by weight of solids and which also contains substantially all the aromatic constituents of said coffee, substantially 56% by weight of said solids being carbohydrates, then making a second aqueous extract of the spent coffee grounds with water at a temperature which is sufficiently above 100° C. to produce a second aqueous extract which has substantially 1% by weight of non-carbohydrate solids and about 9% by weight of carbohydrates, then concentrating said second aqueous extract until it contains at least substantially 66% by weight of solids, then mixing the substantially unconcentrated first aqueous extract and the concentrated second aqueous extract at a temperature below 100° C. while retaining said aromatic constituents, dissolving additional carbohydrate material in said mixture so that dissolved carbohydrates are about 76% by weight of the total solids in said mixture, then evaporating the water from said mixture to produce said dry extract.

7. A method of making a dry powdered water-soluble coffee extract, which consists in extracting roasted and ground coffee in a first extraction stage with water, the maximum temperature of said water in said first extraction stage being substantially 100° C., the aqueous extract thus produced in said first extraction stage containing substantially all of the water-soluble constituents of said roasted and ground coffee including the aromatic constituents of said roasted and ground coffee, then making a second aqueous extract of the spent coffee grounds which remain after said first extraction stage, said second aqueous extract being made at a temperature above 100° C. and while hydrolyzing at least some of said spent coffee grounds, then intermixing said first extract in substantially unconcentrated form with said second extract at a temperature below 100° C. while retaining substantially all of said aromatic constituents in said first extract, and then evaporating the water of said mixed extracts to produce said dry extract.

8. A method according to claim 5, in which said first aqueous extract is made originally with at least substantially 25% by weight of dissolved solids, and said second aqueous extract is made originally with at least substantially 10% by weight of dissolved solids.

9. A method of making a dry powdered water-soluble coffee extract, which consists in extracting roasted and ground coffee in a first extraction stage with water, the maximum temperature of said water in said first extraction stage being substantially 100° C., the temperature in said first extraction stage and the period of extraction being sufficient to produce a first aqueous extract which contains at least substantially 25% by weight of dissolved material which includes substantially all the aromatic constituents of said coffee, then making a second aqueous extract of the spent coffee grounds which remain after the first extraction stage, said second aqueous extract being made with a larger volume of water than the first extract and with sufficient hydrolysis of said spent coffee grounds to produce a second liquid extract which has at least 10% by weight of dissolved solids, intermixing said extracts at a temperature below 100° C. while retaining said aromatic constituents, and then evaporating the water of said mixture to produce said extract.

RICHARD HUGUENIN.

CERTIFICATE OF CORRECTION.

Patent No. 2,380,046. July 10, 1945.

RICHARD HUGUENIN.

It is hereby certified that error appears in the printed specification of the above numbered patent requiring correction as follows: Page 4, first column, line 47, claim 5, before the word "some" insert --least--; and that the said Letters Patent should be read with this correction therein that the same may conform to the record of the case in the Patent Office.

Signed and sealed this 6th day of November, A. D. 1945.

Leslie Frazer (Seal) First Assistant Commissioner of Patents.

Certificate of Correction

Patent No. 2,380,046.                                                              July 10, 1945.

RICHARD HUGUENIN

It is hereby certified that errors appear in the printed specification of the above numbered patent requiring correction as follows: Page 3, second column, line 73, claim 2, page 4, first column, line 6, claim 3, and second column, line 40, claim 8, for the claim reference numeral "5" read *1*; and that the said Letters Patent should be read with these corrections therein that the same may conform to the record of the case in the Patent Office.

Signed and sealed this 13th day of May, A. D. 1947.

[SEAL]

LESLIE FRAZER.
*First Assistant Commissioner of Patents.*